United States Patent [19]

Bour et al.

[11] 4,345,065
[45] Aug. 17, 1982

[54] METHOD FOR POLYMERIZING PYRROLIDONE WITH PREHEATING OF CATALYST SOLUTION

[75] Inventors: Edmond H. J. P. Bour, Limbricht; Johannes A. L. Brouwers, Echt; Jean M. M. Warnier, Urmond, all of Netherlands

[73] Assignee: Stamicarbon B.V., Geleen, Netherlands

[21] Appl. No.: 138,454

[22] Filed: Apr. 8, 1980

[30] Foreign Application Priority Data

Apr. 14, 1979 [NL] Netherlands ........................ 7902966

[51] Int. Cl.$^3$ ...................... C08G 69/16; C08G 69/24
[52] U.S. Cl. .................................... 528/312; 528/325; 528/326
[58] Field of Search ............................... 528/312, 326

[56] References Cited

U.S. PATENT DOCUMENTS

| | | | |
|---|---|---|---|
| 3,721,652 | 3/1973 | Barnes | 528/326 |
| 3,793,258 | 2/1974 | Reinking et al. | 528/312 |
| 3,842,047 | 10/1974 | Pusztaszeri | 528/326 |

*Primary Examiner*—Harold D. Anderson

[57] ABSTRACT

An improved, consistent quality anionic catalyst for polymerizing pyrrolidone, optionally mixed with up to 25% of another copolymerizable lactam, is disclosed in which an alkali metal pyrrolidonate, prepared by reacting an alkali metal hydroxide or alkoxide with a molar excess of pyrrolidone, is heated for at least 5 hours at 100°–175° C. in the absence of water and air. Reproduceable results are obtained when the catalyst so heated is used to polymerize pyrrolidone.

5 Claims, No Drawings

METHOD FOR POLYMERIZING PYRROLIDONE WITH PREHEATING OF CATALYST SOLUTION

BACKGROUND OF THE INVENTION

The present invention relates to a method for polymerizing pyrrolidone with an anionic catalyst and an accelerator.

Polymerizing pyrrolidone, optionally mixed with another copolymerizable lactam, such as δ-valerolactam or ε-caprolactam, by means of an anionic catalyst and one or more accelerators is already known. The anionic catalyst is, in most cases, an alkali pyrrolidonate. This compound can be made by heating an alkali hydroxide or alkoxide with an excec of pyrrolidone, so that the corresponding pyrrolidonate is formed. The water and/or alcohol formed during the reaction is distilled off as soon as possible at reduced pressure and at a temperature of between 50°–150° C.

A problem in this known method is that the catalyst quality varies, particularly if in the preparation of the catalyst small quantities of oxygen are present, and that γ-amino-butyric acid is formed, an undesirable by-product.

It is thus an object of the invention to make a catalyst of constant quantity, so that reproduceable polymerization will be possible.

DETAILED DESCRIPTION OF THE INVENTION

According to the present invention, pyrrolidone, optionally mixed with up to 25 moles % of another copolymerizable lactam, is polymerized by means of one or more accelerators and an anionic catalyst that is prepared by heating an alkali hydroxide or alkoxide with an excess of pyrrolidone and distilling off the resulting water and/or alcohol. In the preparation process, the catalyst solution in pyrrolidone is heat-treated before commencement of the polymerization reaction for at least 5 hours at a temperature of between 100°–175° C. with exclusion of water and oxygen. The catalyst solution thus treated contains substantially less γ-amino-butyric acid than the non-treated catalyst solution and exhibits a constant quality. If in the catalyst preparation oxygen has been present, the catalyst quality is considerably improved by the heat treatment. During the treatment there is no premature polymerization. The catalyst quality becomes constant, which means that it will be easy to effect the polymerization reproduceability.

The catalyst solution is obtained by reacting between about 0.01 and about 0.2 mole of alkali compound with 1 mole of pyrrolidone. Preferably between about 0.02 and about 0.1 mole of alkali compound is used.

As the alkali compounds, the most suitable are the alkali hydroxides, either in solid form or in the form of a concentrated aqueous solution. As alkali metal, sodium or potassium is mostly used. To be accurate, whenever reference is made herein to the formation of pyrrolidonates, one cannot rule out that, in reality, other compounds are formed; see the U.S. Pat. No. 3,842,047. The water formed is removed from the catalyst solution as soon as possible at a pressure of between about 1 and about 15 Pa and a temperature of between about 50° and about 150° C. The removal of water is preferably accomplished in a falling-film evaporator.

After the preparation of the catalyst, and preferably consecutively, the catalyst solution is subjected to the heat treatment of the type desired according to the invention. The temperature in this treatment is between 100° and 175° C., and preferably between 110° and 130° C. The treatment is carried out for at least 5 hours, and preferably for at least 12 hours. Longer periods are possible and may be used if desired. After the changes occurring in the initial stage of the heat treatment, the catalyst will be of a constant quality. The heat treatment is carried out with exclusion of oxygen and water. We have found that the best procedure is to maintain an inert atmosphere of, for instance, dry and oxygen-free nitrogen or noble gas over the catalyst solution. The treatment can be carried out in a simple heated vessel, preferably with an agitator.

After the heat treatment, the catalyst solution is used in the polymerization reaction by bringing it to the polymerization temperature and adding one or more accelerators and, optionally, extra monomer, all according to known procedures. The polymerisation is described in more detail in i.a. U.S. Pat. No. 3,721,652 and Belgian Pat. No. 873.497, the disclosure of which is hereby incorporated by reference. The polymerization temperature is, as usual, between about 20° and about 75° C., and preferably between about 30° and about 55° C. Optionally, quaternary ammonium compounds can also be added as extra catalyst components. After the polymerization, the resulting polymer is worked up in the usual manner.

The invention will be further explained with reference to the following example, it being understood that the invention is not restricted to the procedure described below. Unless otherwise indicated, all parts and percentages are by weight.

EXAMPLE

Solutions of potassium pyrrolidonate in pyrrolidone were prepared by adding solid potassium hydroxide to boiling pyrrolidone and, consecutively distilling off, in a falling-film evaporator, the water formed and about 4% by weight of the supplied pyrrolidone at 6.5 Pa, a bottom temperature of 145° C. and a top temperature of 95° to 97° C. A sample of the catalyst solution thus obtained was immediately cooled down to 30° C. and used for standard polymerization. The remaining quantity was consecutively stored under water and oxygen-free nitrogen at a temperature of 115° C. The catalyst preparation with consecutive heat treatment was carried out three times, in Experiments A, B and C.

The quality of the catalyst solution was determined by standard polymerization with 3.0 moles % of $CO_2$ as the accelerator at 50° C. for 24 hours. The polymer obtained in this process was carefully washed with water and dried. In Experiments A and B, the -amino-butyric acid content was also determined both immediately after the catalyst preparation and after a heat treatment of 24 hours. In Experiment C, additional precautions were taken so as to rule out the entry of even minute quantities of oxygen during the catalyst preparation. This resulted in an improved catalyst. It is, however, difficult in a larger-scale catalyst preparation always to proceed in such a careful manner. The results obtained are summarized in the following Table.

TABLE

| Expt. | KOH | Heat Treatment (h) | γ-amino-butyric acid | Polymerization conversion % | $\eta_{rel}$* |
|---|---|---|---|---|---|
| A | 9.6 | 0 | 0.8 | 11 | 20 |
| A | 9.6 | 24 | 0.3 | 40 | 77 |
| B | 9.8 | 0 | 0.7 | 14 | 23 |
| B | 9.8 | 24 | 0.3 | 41 | 79 |
| C | 10.1 | 0 | not determined | 56 | 76 |
|  | 10.1 | 24 | not determined | 48 | 77 |
|  | 10.1 | 95 | not determined | 50 | 83 |

*Relative viscosity, determined with 1 g polymer in 100 ml 96% sulfuric acid at 20° C.

What is claimed is:

1. In a method for polymerizing pyrrolidone monomer, or pyrrolidone mixed with up to 25 mole % of another copolymerizable lactam monomer, with at least one polymerization accelerator, and, as catalyst solution, an alkali metal pyrrolidonate dissolved in pyrrolidone solvent, to produce a solid pyrrolidone polymer, the improvement wherein the catalyst solution is heated for at least 5 hours at a temperature between 100° C. and 175° C. in the absence of both oxygen and water prior to polymerization.

2. The method according to claim 1, wherein said catalyst solution is heat treated at a temperature of between about 110° and about 130° C.

3. The method according to claim 1 or 2, wherein said catalyst solution is maintained at the elevated temperature for at least 12 hours.

4. The method according to claim 1 or 2, wherein said catalyst solution contains between 0.02 to 0.01 mole of alkali per mole of pyrrolidone.

5. In a method for polymerizing pyrrolidone monomer, or pyrrolidone mixed with up to 25 mole % of another copolymerizable lactam monomer, with at least one polymerization accelerator, and, as catalyst solution, an alkali metal pyrrolidonate dissolved in pyrrolidone solvent, to produce a solid pyrrolidone polymer, the improvement wherein the catalyst solution is heated for at least 12 hours at a temperature between 110° C. and 130° C. in the absence of both oxygen and water prior to polymerization.

* * * * *